United States Patent [19]
Furukawa et al.

[11] 3,854,933
[45] Dec. 17, 1974

[54] METHOD OF PURIFYING SODIUM METAL

[75] Inventors: Kazuo Furukawa; Yoshio Kato; Hideo Ohno; Hiroji Katsuta, all of Ibaragi-ken, Japan

[73] Assignee: Japan Atomic Energy Research Institute, Tokyo, Japan

[22] Filed: June 28, 1971

[21] Appl. No.: 157,547

[30] Foreign Application Priority Data
June 29, 1970 Japan.............................. 45-55942

[52] U.S. Cl. .................................................. 75/66
[51] Int. Cl............................................ C22b 27/00
[58] Field of Search ....................................... 75/66

[56] References Cited
UNITED STATES PATENTS

| | | | |
|---|---|---|---|
| 2,029,998 | 2/1936 | Gilbert et al............................ | 75/66 |
| 2,054,316 | 9/1936 | Gilbert et al............................ | 75/66 |
| 2,124,564 | 7/1938 | Gilbert et al............................ | 75/66 X |
| 2,224,814 | 12/1940 | Gilbert et al............................ | 75/66 X |
| 2,745,552 | 5/1956 | Bruggeman et al.................. | 75/66 X |
| 2,879,157 | 3/1959 | Batutis et al............................ | 75/66 |
| 3,243,280 | 3/1966 | Bohlmann et al...................... | 75/66 |
| 3,265,490 | 8/1966 | Yoshizawa et al..................... | 75/66 |
| 3,429,692 | 2/1969 | Doi et al. ............................. | 75/66 X |
| 3,508,907 | 4/1970 | Graff et al. ............................ | 75/66 |
| 3,600,155 | 8/1971 | DeVries et al......................... | 75/66 |

FOREIGN PATENTS OR APPLICATIONS

| | | | |
|---|---|---|---|
| 12,217 | 1964 | Japan.................................... | 75/66 |
| 591,791 | 2/1960 | Canada................................. | 75/66 |

Primary Examiner—L. Dewayne Rutledge
Assistant Examiner—M. J. Andrews
Attorney, Agent, or Firm—Stevens, Davis, Miller & Mosher

[57] ABSTRACT

A contaminated sodium is advantageously purified by dissolving calcium and/or magnesium and/or an alloy thereof in a molten sodium containing impurities and cooling the molten mixture to separate the impurities together with the added metal or alloy.

5 Claims, 1 Drawing Figure

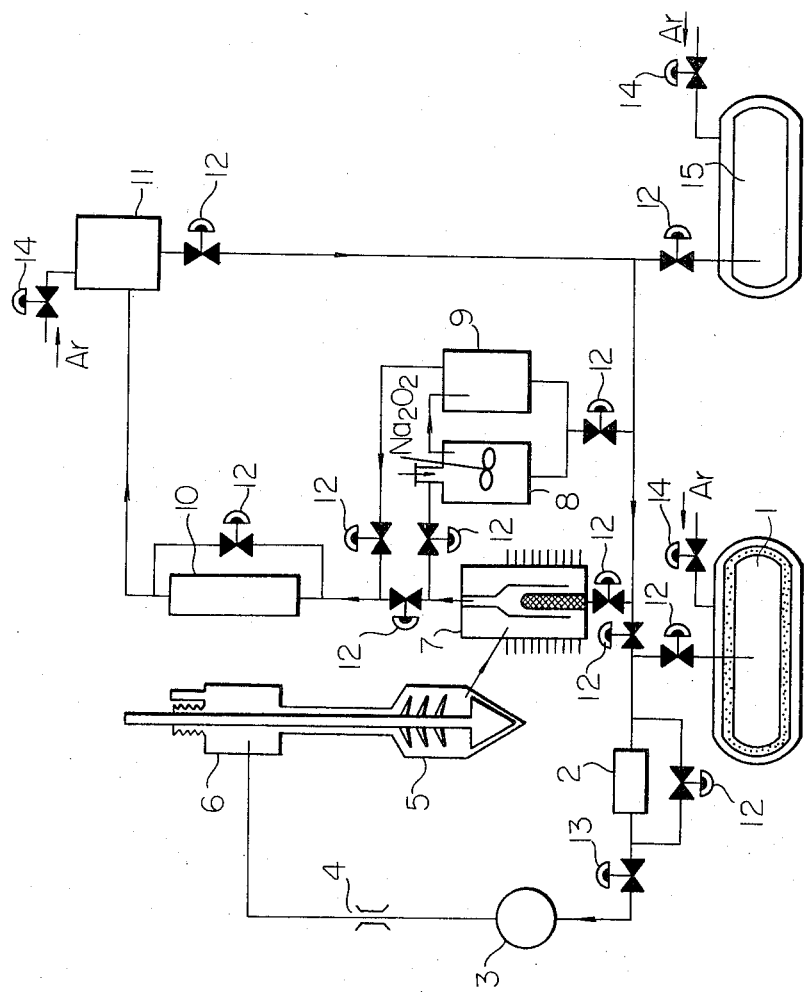

METHOD OF PURIFYING SODIUM METAL

BACKGROUND OF THE INVENTION i. Field of the Invention:

The present invention relates to a method of purifying sodium metal, particularly to a process for removing a small amount of contaminants (impurities) in metallic sodium, more particularly to a process for purification of sodium in which calcium and magnesium are dissolved in a contaminated sodium at a high temperature (preferably about 500° – 700° C) and thereafter are recrystallized and/or oxidizing at a low temperature (preferably about 120° – 200° C) in order to remove the contaminants resulting from damaged nuclear fuel and nuclear fission products from the sodium which is to be used as nuclear reactor coolant.

ii. Description of the Prior Art:

The following conventional processes are used to remove a small amount of impurities from metallic sodium:

1. Refining by electrolysis: The contaminated sodium may be refined electrolytically in a molten salt bath which is similar to that for usual electrolytic refining of sodium. However, this process needs a complicated plant and the operation is not so easy.

2. Hot trap method: Some kinds of elements can be separated from the contaminated sodium by use of graphite, metals and the like. For instance, oxygen can be trapped by zirconium, and carbon by stainless steel. However, this method is limited in its application and is not enough for the purification of sodium. Moreover, the impurities react with the trap materials in solid phase, so the reaction rate is comparatively low.

3. Filtration: Elimination of the suspended particles of the impurities by use of a stainless steel filter with 1 $\mu$ mesh may be effected, but the solutes and small particles less than 1 $\mu$ in diameter can not be removed.

4. Distillation: The impurities having vapor pressures different from that of sodium can be effectively separated. However, the efficiency of the elimination of the solute is generally low when the concentration of the solute is low.

SUMMARY OF THE INVENTION

The present invention provides a process in which calcium and/or magnesium and/or a calcium-magnesium alloy are dissolved in molten metallic sodium at a high temperature, thereafter, these dissolved metals are precipitated at a lower temperature, whereby the many kinds of impurity elements are eliminated from the sodium. It is possible to separate contaminants from sodium more effectively with this process than with any of the abovementioned separation methods. Furthermore, the separation of many kinds of impurities by means of absorption, occlusion and co-precipitation together with deposits of the additive components is simultaneously expected.

The solubility of magnesium and calcium (by weight percent) in molten sodium at different temperatures is given below.

|     | 150°C | 400°C | 500°C | 600°C |
| --- | --- | --- | --- | --- |
| Mg: | 0.2 | 0.8 | 1.0 | 1.5 |
| Ca: | 0.1 | 2 | 3.5 | 8 |

It is easy to dissolve magnesium and/or calcium in concentrations up to about 1 – 8 weight percent in molten sodium at the temperature of about 500° – 600° C. According to the present invention, the elements present as impurities in the molten sodium are separated by making these elements dissolve in or react with calcium and/or magnesium when the system is cooled to about 150° C and the additive metals are recrystallized.

All the elements, which are more soluble in calcium and magnesium than in sodium or which react with these additive metals to form stable compounds, can be separated by the process of the present invention. For instance, oxygen (O), nitrogen (N), sulfur (S), strontium (Sr), barium (Ba), antimony (Sb), samarium (Sm), praseodymium (Pr), lanthanum (La), cerium (Ce), nickel (Ni), silicon (Si), tin (Sn), zinc (Zn), thallium (Tl), thorium (Th), plutonium (Pu), rhodium (Rh), lead (Pb) and the like can be separated by this process. Moreover, the application of the process is not restricted to only the elements shown above; a good number of other elements may also be similarly eliminated.

The addition of calcium and/or magnesium to the contaminated sodium effectively eliminates impurities, as described above. It is preferably that both additive metals be applied in the form of alloys with low melting points having a composition in the neighbourhood of, for instance, Ca : Mg = 82 w/o : 18 w/o (m.p: 445° C) or Ca : Mg = 16 w/o : 84 w/o (m.p: 517° C), the melting points of which correspond to the eutectic points respectively in the binary system, since both the metals have high melting points (Ca, 850° C; Mg, 650° C). The former alloy is preferable to the latter, since the former has a lower melting point and the composition is similar to the ratio of the solubilities in sodium shown in the above table. The additive metals may be applied without alloying or each metal may be applied individually.

The temperature of the molten sodium ranges from a temperature at which the metals or alloys to be added melt to a temperature lower than the boiling point of sodium metal, and is generally about 450° – 850° C and preferably about 500° – 700° C. The temperature at which the added metal or metals are separated ranges from a temperature higher than melting point of sodium metal to about 250° C, and preferably is from about 120° to 200° C.

The amount of calcium and/or magnesium and/or an alloy thereof to be added depends both on the temperature of the molten sodium and on the amount of impurities to be removed. It is generally about 0.5 – 15 percent and preferably about 1 – 8 percent by weight of sodium metal.

BRIEF DESCRIPTION OF THE DRAWING

The attached drawing is a flow sheet to illustrate an embodiment of the purification process of this invention.

DESCRIPTION OF THE PREFERRED EMBODIMENT

The present invention is further explained below in relation to the example of the process for purification of metallic sodium used as nuclear reactor coolant, as shown in the attached drawing. It will be understood that the example shown below is only for illustration and should not restrict or limit the scope of the present invention.

EXAMPLE

A thick walled steel vessel filled with argon gas was charged with 340 grams of calcium and 70 grams of magnesium, and the contents were heated at 650° C with stirring, whereby both metals were converted to a molten alloy with a melting point of about 450° C. Then, the molten Ca—Mg alloy was cast in granules with a diameter of less than 0.5 cm.

Separately, about 30 kgs of sodium which had been contaminated by uranium dioxide and fission products as a result of direct contact with the irradiated uranium dioxide in a nuclear reactor, was charged in a storage tank (1) shielded by lead, which was located in the piping system for sodium circulation shown in the attached drawing. Total radioactivity of the contaminated sodium was about 10 m Ci. The whole piping system was heated to above 200° C, after which the molten sodium was forced through the piping at the rate of 1 kg/min. and was passed through a cold filter (2) (sintered stainless steel filter with 20 $\mu$ mesh) kept at 150° C and, then, passed into a contact reactor (5) by way of an electromagnetic pump (3) and an electromagnetic flow meter (4). Meanwhile, from an upper supplier (6) held at 400° - 450° C, the granules of the beforementioned Ca—Mg alloy were added to the molten sodium in the contact reactor (5) at the rate of 20 g/min, and were dissolved in the molten sodium in the contact reactor with stirring at 600° C, in order to make the contaminated impurities react thoroughly with the additive elements. Subsequently, the molten sodium was sent to a cold trap (7) where the calcium, magnesium and reaction products were deposited and precipitated.

The lowest temperature of the cold trap is about 130° C. The supernatant molten sodium was sent to an oxidation reactor (8) and sodium peroxide ($Na_2O_2$) was added to the molten sodium at the rate of 8 g/min. at about 250° C in order to remove residual calcium and magnesium in the forms of calcium oxide (CaO) and magnesium oxide (MgO) respectively. The slag was deposited and precipitated thoroughly also in the slag separator (9) which follows after the oxidation reactor. The slag separator (9) was kept at a minimum of 130° C.

Thereafter, the molten sodium was passed through a filter (10) which consists of stainless steel wire nets and a sintered stainless steel filter with 1 $\mu$ mesh at lowest. Finally, the purified molten sodium was gathered in an expansion tank (11). The radioactivity of the 20 kgs of purified sodium which was gathered in the tank after the addition of calcium-magnesium alloy and sodium peroxide for about 20 min., was less than 1/1,000 that of the contaminated sodium before treatment. Unless otherwise specified, the arrows in the attached drawing show the direction of flow of the molten sodium, and the marks which are indicated by numbers 12, 13, 14 and 15 show valves for stopping molten sodium, throttling valve for regulating the flow rate of molten sodium, gas valve (for argon gas in this example) and drain tank respectively.

Calcium exists generally in ground metal of sodium in relatively large quantities (about 20 ppm). This content can be easily reduced to the standard content by selective oxidation by sodium peroxide or the like. Magnesium has characteristics similar to those of calcium and the reaction between sodium and neutrons in a nuclear reactor produces magnesium. Therefore, the application of the process does not result in addition of new impurities. This process has great advantages in that most impurity elements react with the additive metals with high reaction rate and are separated from sodium with high efficiency. In this process the purification of sodium, which is difficult by physical methods such as filtration, distillation and the like, proceeds chemically in a liquid phase. Substantial amount of impurities may be adsorbed and/or occluded to be coprecipitated together with the deposits such as calcium, magnesium, sodium and their compounds, calcium oxide, magnesium oxide and the like.

In the practical application of the invention, the reaction temperature and the operation temperature are changeable within fairly wide ranges. Furthermore, those skilled in the art will readily understand that removal of the residual calcium and magnesium in sodium by oxidation using sodium peroxide or the like can be replaced with other reasonable method and the processes of distillation, hot trap and the like can be also used together with the present process.

What we claim is:

1. A method of purifying sodium metal used as nuclear reactor coolant and contaminated with damaged nuclear fuel and nuclear fission products comprising elements selected from the group consisting of O, N, S, Sr, Ba, Sb, Sm, Pr, La, Ce, Ni, Si, Sn, Zn, Tl, Th, Pu, Rh, and Pb which comprises dissolving at least one species of metallic additives selected from the group consisting of calcium, magnesium or an alloy thereof in molten contaminated sodium at a temperature of about 450°–850° C and cooling the molten mixture to a temperature a little higher than the melting point of sodium metal to separate the metallic additives and the impurities chemically bonded therewith, dissolved, occluded or absorbed therein.

2. A method as set forth in claim 1, in which a calcium-magnesium alloy having the melting point in the vicinity of eutectic points in the binary system is employed.

3. A method as set forth in claim 1, in which the temperature employed to separate the substantial amount of the metallic additive is about 120° - 250° C.

4. A method as set forth in claim 1, in which the amount of the metallic additive to be employed is about 0.5 - 15 percent by weight of the contaminated sodium.

5. A method as set forth in claim 1, in which the elements to be removed are those having higher solubilities in calcium and magnesium than in sodium or those forming stable compounds by reaction with calcium or magnesium.

\* \* \* \* \*